March 15, 1955     S. G. HEADINGS     2,703,984
GRAIN SAMPLER
Filed Sept. 14, 1953
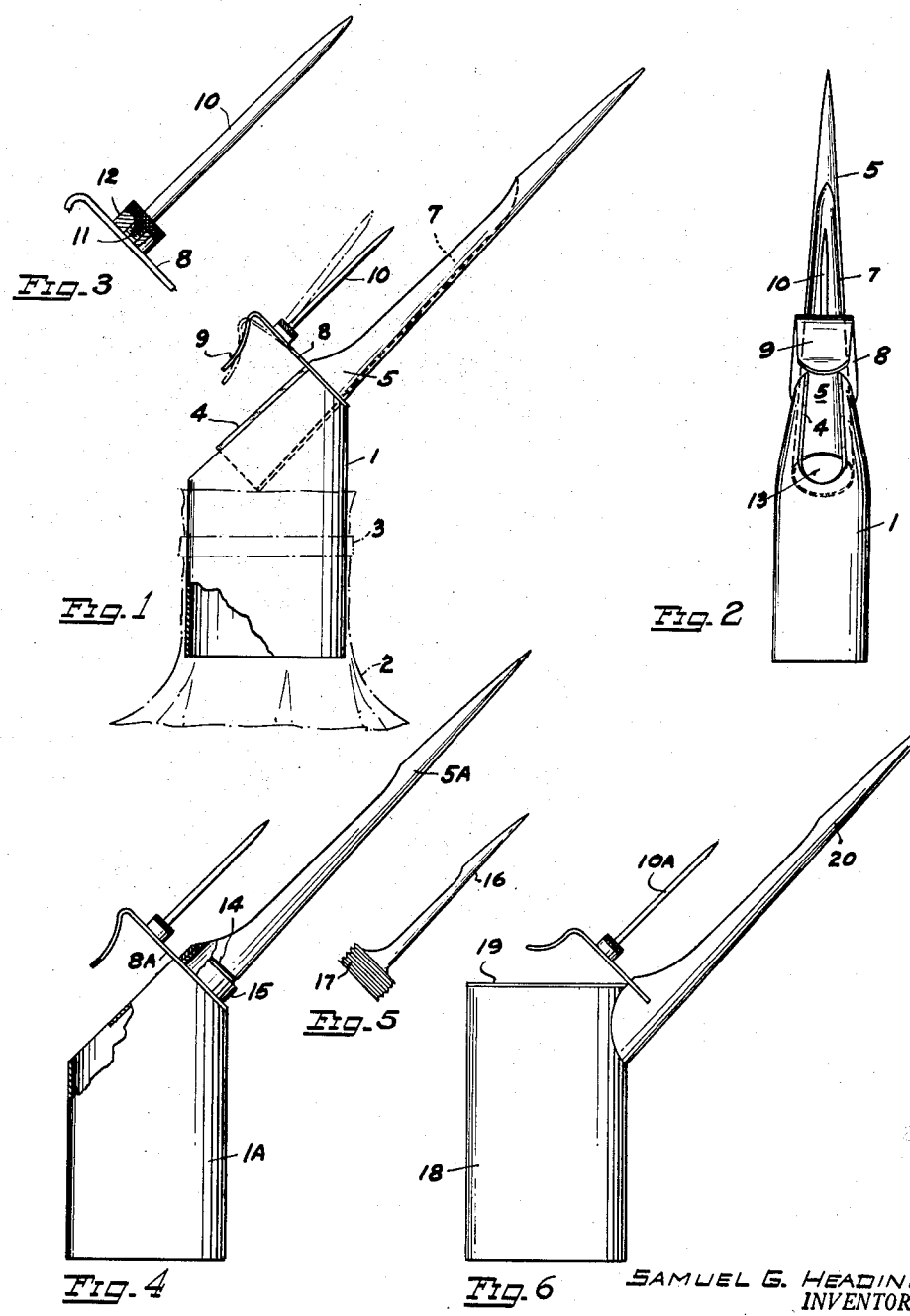
SAMUEL G. HEADINGS
INVENTOR.

United States Patent Office 2,703,984
Patented Mar. 15, 1955

2,703,984
GRAIN SAMPLER
Samuel G. Headings, Albany, Oreg.

Application September 14, 1953, Serial No. 379,805

3 Claims. (Cl. 73—425)

This invention relates to improvements in an implement for use in withdrawing grain and seeds from their sacks for sampling purposes.

The invention is particularly useful in warehouses and the like wherein a sampler is required to climb highly stacked sacks of grain and seeds in order to obtain samples at random from sacks at various locations throughout the stack or stacks. Heretofore this task has been accomplished by a sampler holding on as best he could while thrusting a tube or the like into a sack with one hand and with his other hand holding a receptacle to catch the seeds draining from the tube.

Accordingly it is one of the principal objects of the present invention to provide a sampling implement wherein the grain or seed withdrawing means and a receptacle are combined into a single unit operable by one hand of a user.

A further object of the invention is the provision of an agitator adapted to be thrust into a sack along with the grain or seed withdrawing means and conveniently operable from the exterior thereof for loosening the contents of the sack for quick removal.

The foregoing and other objects will appear as my invention is more fully hereinafter described in the following specification, illustrated in the accompanying drawings, and finally pointed out in the appended claims.

In the drawing:

Figure 1 is a side view of a seed sampling implement made in accordance with my invention.

Figure 2 is a rear view of Figure 1.

Figure 3 is an enlarged fragmentary detail view of an agitator.

Figure 4 is a side view of a modified form of the invention.

Figure 5 is a detail view of an interchangeable needle.

Figure 6 is a side view of a further modified form of the invention.

Referring now more particularly to the drawing:

In Figures 1 and 2 reference numeral 1 indicates a hollow vertical hand grip preferably of elliptical shape in cross-section and open at its bottom end for communication with the interior of a receptacle 2 which may be a paper or cloth bag attachable to the hand grip by an elastic band 3 or which may be held to the hand grip by the hand of a user.

The top end of the hand grip is turned inwardly on both of its sides as indicated at 4 for attachment by soldering or the like to the inner end of a needle indicated at 5. The needle is open at its large end and is of hollow construction for the major portion of its length as indicated at 7 and tapers to a blunt point at its opposite end. Secured to the top end of the hand grip 1 and surrounding the needle is a flexible metallic plate 8 turned slightly downwardly and outwardly at its outer end as at 9 to provide a finger grip. Removably secured to the plate 8 is an agitating needle 10 threaded at its inner end as at 11 for removable attachment to a nut 12 secured to the plate.

It will be noted in Figure 2 that an opening 13 exists between the inner end of the needle 5 and the back wall of the hand grip. This provides a sight opening for an operator so that he can determine whether grain or seeds are flowing from the needle into the hand grip.

In the modified form of the invention shown in Figure 4 the needle 5A is of less length than in the preferred form and is threaded as at 14 at its large end for threaded engagement with an internally threaded collar 15 permanently secured by soldering or the like to the plate 8A through which an opening is formed so that grain or seeds will flow freely from the needle into and through the hand grip 1A.

In Figure 5 I have shown a replacement needle indicated at 16 and provided at its large end with threads 17 of the same diameter as those indicated at 14 on the needle 5A so that the smaller needle 16 can be used instead of the large needle when desired or necessary in dealing with certain types of seeds.

In the further modification shown in Figure 6 the hand grip 18 is closed at its top end by a closure plate 19 in which a sight opening can be formed if desired. The needle 20 is of the same construction as those in the other forms of the invention but its large end is permanently secured to the front wall of the hand grip by soldering or the like and is in open communication with the interior of the handle by an opening formed therethrough. This form of the invention is also provided with the agitating needle 10A.

In all three forms of the invention the agitating needle may be removed from the plate 8 when desired.

In operating the implement without the agitator, the operator thrusts the needle 5 into a sack of grain to a distance where the plate 8 will bear against the surface of the sack whereupon grain or seeds will flow down through the hollow trough portion of the needle and into and through the hand grip and finally into a receptacle attached to or held in engagement with the hand grip. When the agitator is used, an operator by intermittent thumb pressure on the finger grip 9 can oscillate the needle from the full to broken line positions shown in Figure 1 by deflecting the plate 8 as shown in broken lines.

While I have shown a particluar form of embodiment of my invention I am aware that many minor changes therein will readily suggest themselves to others skilled in the art without departing from the spirit and scope of the invention. Having thus described my invention what I claim as new and desire to protect by Letters Patent is:

1. An implement of the class described comprising in combination a hollow handle, a needle of open hollow construction for a portion of its length and secured at one of its ends to said handle and in open communication with the interior thereof, and an auxiliary needle yieldingly attached to said handle for simultaneous insertion into a container with the first mentioned needle to agitate the contents of the container.

2. An implement of the class described comprising in combination a hollow handle, a needle tapering to a point at one of its ends and being of hollow tubular construction at its opposite end and removably secured to said handle and in open communication with the interior of the handle, that portion of the needle intermediate its said ends being of trough formation to receive contents of a container and to direct them through said tubular end of the needle and into said hollow handle, and an auxiliary needle removably and yieldingly attached to said handle in parallel relation to the first mentioned needle and insertable therewith into a container to agitate the contents thereof.

3. An implement of the class described comprising in combination a hollow handle, a needle tapering to a point at one of its ends and being of hollow tubular construction at its opposite end and secured to said handle and extending upwardly and outwardly therefrom and in open communication with the interior of the handle, that portion of the needle intermediate its said ends being of trough formation to receive contents of a container and to direct them through said tubular end of the needle and into said hollow handle, and an auxiliary needle removably and yieldingly attached to said handle in parallel relation to the first mentioned needle and insertable therewith into a container to agitate the contents thereof.

References Cited in the file of this patent

UNITED STATES PATENTS 2,584,520    Wilkins _____ Feb. 5, 1952

FOREIGN PATENTS 31,525    Sweden _____ Sept. 16, 1911